2,769,703

METHOD OF PRODUCING PHOSPHATE FERTILIZERS

Louis E. Andrès, Saint Gratien, and Yves J. Berquin, Paris, France, assignors to Potasse & Engrais Chimiques, Paris, France, a societe anonyme of France No Drawing. Application January 18, 1956, Serial No. 559,789

Claims priority, application France August 31, 1951

11 Claims. (Cl. 71—39)

This invention relates to the production of phosphate fertilizers, and more particularly to the production of phosphate fertilizers which contain calcium phosphate in a form which is soluble in ammonium citrate and insoluble in water and which contains no calcium phosphate in a form which is insoluble in ammonium citrate.

This application is a continuation-in-part of our copending application Serial No. 301,780 filed July 30, 1952, now abandoned.

It is generally recognized that the larger the fraction contained in a phosphate fertilizer, of phosphoric acid in a form soluble in ammonium citrate, the greater is the agricultural and market value of the fertilizer. The presence of phosphoric acid in a form which is water-soluble detracts from the stability of the fertilizer during storage. It is therefore desirable to produce a fertilizer free from phosphoric acid in a form which is water soluble. Consequently, it is logical to neutralize phosphate fertilizers as completely as possible in order to eliminate all water-soluble phosphoric acid. In other words, it is desirable to produce a fertilizer which is free from mono-calcium phosphate (which is soluble in water), and free from tri-calcium phosphate (which is insoluble in ammonium citrate) so that the phosphate in the fertilizer is in the form of di-calcium phosphate (which is soluble in ammonium citrate and insoluble in water). That is to say, it is desirable to produce a phosphate fertilizer in which the phosphorous [in the parlance of the trade it is commonly referred to as phosphoric acid ($P_2O_5$)] is present in a form which is soluble in ammonium citrate, insoluble in water and in which there is no phosphoric acid ($P_2O_5$) which is insoluble in ammonium citrate. In speaking herein of solubility, it will be understood that what is meant is solubility according to the tests customarily applied to commercial practice in the fertilizer industry.

The processes commonly employed in producing phosphate fertilizers from natural phosphate rock do not permit of the production of a fertilizer which contains all of its calcium phosphate in a form which is soluble in ammonium citrate and which is free from calcium phosphate in a form which is soluble in water and at the same time free from calcium phosphate in a form which is insoluble in ammonium citrate. In fact, if a natural phosphate rock is treated with a mineral acid, and if to the product of this treatment is added a neutralizing agent such as lime, calcium carbonate, or ammonia, it is found that there is formation of a certain amount of calcium phosphate in a form which is insoluble in ammonium citrate before the complete disappearance of phosphoric acid in a form soluble in water. Consequently, the fertilizers obtained by the processes ordinarily used in commercial practice contain either water-soluble phosphoric acid in the form of mono-calcium phosphate, in which case the fertilizer is unstable when stored, or phosphoric acid in a form of a calcium phosphate which is insoluble in ammonium citrate, in which case the fertilizer has a lower market value than it would have if all the phosphoric acid were present in a form soluble in ammonium citrate.

It is an object of this invention to provide a process for the manufacture of a phosphate fertilizer from natural phosphate rock in which fertilizer the phosphoric acid is present in a form which is soluble in ammonium citrate and insoluble in water and containing no phosphoric acid in a form which is insoluble in ammonium citrate.

According to the process of this invention, after or during the time a natural phosphate, such as phosphate rock, is treated in the usual way with a mineral acid, such, for example, as nitric acid, a compound of aluminum capable of producing aluminum ions, is added to the product of the reaction of phosphate rock and mineral acid; and a neutralizing agent is introduced into the mass until disappearance of all phosphoric acid ($P_2O_5$) in water soluble form is effected; the amount of aluminum compound added being that which is sufficient to insure the presence in the mixture of at least 20 mols of Al to 100 mols of $P_2O_5$. The fertilizer will be free from mono-calcium phosphate and will not contain any phosphoric acid in a form which is water-soluble. The aluminum ions may be added at any time prior to drying the fertilizer.

We have found that if the procedure according to the invention is followed, the calcium phosphate which is present or formed is completely soluble in ammonium citrate, and remains soluble in this reagent regardless of the temperature at which drying is carried out and despite long periods of storage.

We have conducted tests using different compounds of aluminum, naturally occurring and others (such, for example, as aluminum silicate, silico-aluminate, and phosphate, oxide sulphate and nitrate, of aluminum) and in all cases it was observed that these compounds were effective to produce the desired result when the requisite proportion of aluminum ions were introduced.

The amount of aluminum compound to be added is that which will insure the presence in the reaction product of the rock phosphate and mineral acid of at least 20 atom-grammes (mols) of Al to 100 mols of $P_2O_5$. Below this proportion phosphoric acid in a form which is insoluble in ammonium citrate is produced when a neutralizing agent is added in an amount sufficient to eliminate all water-soluble phosphoric acid. On the other hand, a proportion of aluminum greater than that indicated above is not harmful but presents no particular advantages.

The mass resulting from the reaction of the phosphate rock and mineral acid, and to which has been added the amount of aluminum ions specified above, may be treated with a great excess of neutralizing agent without there being formed any phosphoric acid in a form which is insoluble in ammonium citrate. Sufficient neutralizing agent may be added to make the mass distinctly alkaline and the pH may be raised even as high as $pH_{10}$, whereas with a similar treatment in which aluminum ions are not added and the pH raised to $pH_{10}$, all the phosphoric acid would be present in a form insoluble in ammonium citrate.

The process of the invnetion is applicable to the manufacture of calcium phosphates soluble in ammonium citrate which are simple fertilizers having high agricultural value, and is applicable to the production of super-phosphate which may be completely neutralized without the formation in the fertilizer of calcium phosphate in a form which is insoluble in ammonium citrate. Also, the process of the invention is applicable to the manufacture of complex fertilizers, containing other fertilizer ingredients and such complex fertilizers may be produced which are free from calcium phosphate in a form which is insoluble in ammonium citrate or soluble in water.

In the case of complex fertilizer made by attacking natural phosphate rock with nitric acid, followed by neutralization with ammonia, a complete fertilizer may be made according to the process of the invention which also will be free from calcium nitrate. Calcium nitrate is undesirable because it is water-absorbent. That is, after the introduction of the requisite quantity of aluminum ions into the reaction mass resulting from attack of the nitric acid upon the natural phosphate rock, ammonia may be added in a quantity equivalent to that of the nitric acid used in the acid treatment, then sulphuric acid may be added to convert any lime or calcium nitrate present to calcium sulphate which is a stable compound and not water-absorbent.

Recourse may also be had to phosphoric acid ($H_3PO_4$) to fix the calcium by transforming calcium nitrate present into calcium phosphate.

After the neutralization, carbonic acid gas may also be used to advantage in fixing the lime, but in this case it may be necessary to add to the mass a compound capable of producing sulphate ions in an amount sufficient to insure the presence of a quantity of sulphate ions which is stoichiometrically equivalent to the quantity of aluminum ions introduced. This addition of sulphate ions may be in the form of sulphuric acid, or in the form of a sulphate; gypsum, which occurs in nature being well suited for this purpose. If desired, the addition of sulphate ions may be made at the same time as the aluminum ions are added and this may be accomplished in a single operation by using aluminum sulphate, alum or other aluminum compound containing the sulphate radical.

Although the novel features which are believed to be characteristic of the invention will be pointed out in the annexed claims, the invention itself as to its objects and advantages and the manner in which it may be carried out may be better understood by reference to the following examples taken in conjunction with the foregoing description.

*Example I.*—1,000 kilogrammes of natural Moroccan phosphate assaying 34.2% $P_2O_5$ were treated with 1,450 cubic metres of hydrochloric acid of a density of 1.16. The mixture was agitated for two hours, then 40 kilogrammes of hydrated aluminum oxide, $Al(OH)_3$, were added, and finally 280 kilogrammes of slaked lime in the form of a lime-milk were added. Once precipitation was accomplished, the dicalcium phosphate was filtered out, washed on the filter, then dried. In this way 980 killogrammes of dicalcium phosphate, assaying 34.5% $P_2O_5$ were obtained, of which 99.6% was soluble in ammonium citrate.

*Example II.*—2,500 kilogrammes of natural Tunisian phosphate of the Gafsa type, assaying 27.4% $P_2O_5$ were treated with 3,150 litres of 48.6% nitric acid. 370 kilogrammes of hydrated aluminum sulphate $(SO_4)_3Al_2$, 18 $H_2O$, were added to the paste obtained from the acid treatment, then, while the mass was being constantly agitated, 550 kilogrammes of gaseous ammonia were introduced. When the addition of the ammonia had been completed, 400 kilogrammes of carbonic acid gas were introduced into the paste. After drying, 5,350 kilogrammes of fertilizer were obtained, containing 8.45% nitrogen in the form of nitrates, 8.45% ammoniated nitrogen, and 12.7% phosphoric acid. 99.3% of the phosphoric acid was soluble in ammonium citrate.

In the foregoing examples the aluminum compound which produces Al ions was introduced into the mass prior to the addition of the neutralizing agent. However the aluminum ions may be introduced into the mass at any time prior to drying; that is, either before, during, or after the neutralizing agent is added. Preferably, the aluminum ions should be introduced into the mass prior to the time that the neutralizing agent may have caused a substantial amount of reversion of the $P_2O_5$ to a form which is insoluble in ammonium citrate.

In the following Example III, the aluminum ions were added after the addition of the neutralizing agent but prior to drying. In the following Example IV the conditions were the same as in Example III except that no aluminum ions were added at any time.

*Example III.*—1,050 kilogrammes of natural Moroccan phosphate, analyzing 32% $P_2O_5$, were treated with 3,580 kilogrammes of nitric acid (29% nitric acid). The mass was agitated for two hours and 525 kilogrammes of calcium carbonate, in the form of natural finely crushed chalk, were gradually added to and agitated with the reaction mass to neutralize the mass. When the precipitation was completed, the dicalcium phosphate product obtained was filtered and washed on the filter. Then 88 kilogrammes of dry aluminum sulphate, analyzing 14.2% aluminum, was then added to and worked into the moist filter cake of impure dicalcium phosphate which had been obtained. The resultant reaction mass was dried and 1,000 kilogrammes of dried dicalcium phosphate product analyzing 33% $P_2O_5$ were obtained in which 99.5% of the $P_2O_5$ present was soluble in ammonium citrate.

*Example IV.*—1,050 kilogrammes of Moroccan phosphate, analyzing 32% $P_2O_5$ were treated with 3,580 kilogrammes of nitric acid (29% nitric acid). The mass was agitated for two hours and 525 kilogrammes of calcium carbonate, in the form of natural finely crushed chalk, were gradually added to and agitated with the reaction mass to neutralize the mass. When the precipitation was completed, the dicalcium phosphate product obtained was filtered and washed on the filter and dried but no aluminum ions were added. 915 kilogrammes of dried dicalcium product, analyzing 36% $P_2O_5$, were obtained, in which 27% was soluble in ammonium citrate.

*Example V.*—1,050 kilogrammes of natural Moroccan phosphate, analyzing 32% $P_2O_5$, were treated with 1,870 kilogrammes of 20° Bé. hydrochloric acid. The mass was agitated for two hours and 525 kilogrammes of calcium carbonate, as natural crushed chalk, were gradually added to and agitated with the reaction mass to neutralize the mass. When the precipitation was completed, the dicalcium phosphate product obtained was filtered and washed on the filter. Then 88 kilogrammes of dry aluminum sulphate, analyzing 14.2% aluminum, was then added to and worked into the moist filter cake of impure dicalcium phosphate product which had been obtained. The resultant reaction mass was dried and 1,000 kilogrammes of dried dicalcium phosphate product, analyzing 33% $P_2O_5$, were obtained, in which 99.5% of the $P_2O_5$ was soluble in ammonium citrate.

*Example VI.*—1,050 kilogrammes of natural Moroccan phosphate, analyzing 32% $P_2O_5$ were treated with 1,870 kilogrammes of 20° Bé. hydrochloric acid. The mass was agitated for two hours and 525 kilogrammes of calcium carbonate, as natural finely crushed chalk, were gradually added to and agitated with the reaction mass to neutralize the mass. When the precipitation was completed, the dicalcium product obtained was filtered and washed on the filter and then dried, but no aluminum ions were added. 915 kilogrammes of dried impure dicalcium phosphate product, analyzing 36% $P_2O_5$, were obtained, in which only 27% of the $P_2O_5$ was soluble in ammonium citrate.

*Example VII.*—397 kilogrammes of natural Moroccan phosphate, analyzing 33.4% $P_2O_5$ were reacted with 750 kilogrammes of nitric acid (50% nitric acid). Then 135 kilogrammes of sulfuric acid (98% $H_2SO_4$), 101 kilogrammes of gaseous ammonia, and 15 kilogrammes of alumina [$Al(OH)_3$] were gradually and simultaneously added and agitated with the reaction mass, so that the pH of the mass was gradually raised until it reached pH7. The resultant reaction mass was dried. 1,000 kilogrammes of dried fertilizer analyzing 8% ammoniacal nitrogen, 8% nitrate nitrogen, and 13% $P_2O_5$, in which 99.1% of the P₂O₅ was soluble in ammonium citrate and only 0.1% was water soluble.

It will be seen from the foregoing description that the process of the invention contemplates the addition of aluminum ions, and in some instances sulphate ions, as mentioned herein, to the mass resulting from the reaction of natural phosphate and the mineral acid which is used to attack the natural phosphate so that the reaction product may be completely neutralized so as to eliminate in the product all phosphoric acid in water-soluble form such, for example, as mono-calcium phosphate and all phosphoric acid in a form which is insoluble in ammonium citrate, such for example as tricalcium phosphate, with the result that all the phosphoric acid in the product is in a form which is soluble in ammonium citrate, such, for example, as di-calcium phosphate. Moreover, the calcium present in excess of that required to combine with phosphoric acid in a form which is soluble in ammonium citrate may be converted and fixed, as for example, any calcium nitrate present may be transformed to calcium sulphate which is not water-absorbent and remains fixed. In commercial practice this is sometimes spoken of as fixing the lime.

The terms and expressions which have been employed herein are those customarily used in commercial practice in the fertilizer industry and are used as terms of description and not of limitation, and there is no intention in the use of such terms and expressions of excluding any equivalents of the features shown and described or portions thereof, but it is recognized that various modifications are possible within the scope of invention claimed.

What is claimed is:

1. In a process of manufacturing a phosphate fertilizer in which natural phosphate rock containing calcium phosphate is reacted with nitric acid and there is added a neutralizing agent to the mixture of said phosphate rock and nitric acid, the method of completely neutralizing the mixture and preventing the formation in the reaction product of said phosphate rock, nitric acid and neutralizing agent of calcium phosphate in a form which is insoluble in ammonium citrate which comprises the steps of adding the neutralizing agent to said mixture of phosphate rock and nitric acid in sufficient amount to completely neutralize it and a compound of aluminum in an amount to insure the presence of at least 20 mols of Al to each 100 mols of P₂O₅ present in the mixture and adding to said mixture a compound containing sulphate ions to insure the presence of sulphate ions in an amount to convert all calcium nitrate present into calcium sulphate, said aluminum compound being added after said rock phosphate is reacted with said acid and prior to the addition of said neutralizing agent.

2. In a process of manufacturing a phosphate fertilizer in which natural phosphate rock containing calcium phosphate is reacted with nitric acid and there is added a neutralizing agent to the mixture of said phosphate rock and nitric acid, the steps of adding to said mixture of phosphate rock and nitric acid of a compound containing aluminum in an amount to insure the presence in said mixture of at least 20 mols of Al to each 100 mols of P₂O₅ present in the mixture and adding to the reaction product of said rock phosphate, nitric acid, neutralizing agent and aluminum compound sufficient phosphoric acid to convert any calcium nitrate present into calcium phosphate, said aluminum compound being added after the rock phosphate is reacted with said acid and prior to the addition of said neutralizing agent.

3. In a process of manufacturing phosphate fertilizer in which natural phosphate rock containing calcium phosphate is reacted with nitric acid and ammonia is added to neutralize the reaction product of said phosphate rock and nitric acid, the steps of adding to the mixture of said phosphate rock and nitric acid a compound of aluminum capable of producing Al ions in an amount to insure the presence of at least 20 mols of Al for each 100 mols of P₂O₅ present and a compound capable of producing SO₄ ions to insure the presence of SO₄ ions in an amount stoichiometrically equivalent to the quantity of Al ions introduced and adding carbonic acid in sufficient amount to convert all calcium nitrate present into calcium carbonate thereby to produce a phosphate fertilizer free from calcium nitrate and free from calcium phosphate in a form insoluble in ammonium citrate and in which all calcium phosphate present is in a form soluble in ammonium citrate and insoluble in water, said Al and SO₄ ions being added after said rock phosphate has been reacted with said acid and prior to the addition of said ammonia.

4. In a process of manufacturing phosphate fertilizer in which a natural phosphate rock initially containing water insoluble and ammonium citrate insoluble phosphate in tricalcium form is attacked and reacted with a mineral acid which forms an acidic reaction product in which the initially present tricalcium phosphate is converted to phosphate in a form which is not water insoluble and a neutralizing agent is added to said acidic reaction product to neutralize it, the method of preventing the reversion of phosphate present in the said reaction product to a form which is insoluble in ammonium citrate whereby the neutralized reaction product will be free of phosphate in a form insoluble in ammonium citrate, which method comprises adding aluminum ions to said acidic reaction product after the rock phosphate is reacted with said acid and prior to the completion of said neutralization in the proportion of at least 20 atom-grammes of aluminum to 100 molecules of total P₂O₅ present in the acidic reaction product thereby producing a neutralized phosphate fertilizer free of phosphate in a form which is insoluble in ammonium citrate.

5. In a process of manufacturing phosphate fertilizer in which a natural phosphate rock initially containing ammonium citrate insoluble tricalcium phosphate is attacked and reacted with a nitric acid which forms an acidic reaction product in which the initially present tricalcium phosphate is converted to phosphate in a form which is water soluble and a neutralizing agent is added to said acidic reaction product to neutralize it, the method of preventing the reversion of phosphate present in said acidic reaction product to a form which is insoluble in ammonium citrate whereby the neutralized reaction product will be free of phosphate in a form which is insoluble in ammonium citrate, which method comprises adding aluminum ions to said reaction product after the rock phosphate is attacked by said acid and prior to the completion of said neutralization in the proportion of at least 20 atom/grammes of aluminum to 100 molecules of total P₂O₅ present in the acidic reaction product and also adding to said acidic reaction product sulfate ions in an amount sufficient to convert all calcium nitrate present into calcium sulphate thereby producing a neutralized phosphate fertilizer free from phosphate in a form which is insoluble in ammonium citrate and free from calcium nitrate.

6. A process for the manufacture of a phosphate fertilizer which has a pH not substantially lower than pH7 and substantially free from phosphate in a form which is insoluble in ammonium citrate which comprises reacting natural rock phosphate containing substantial amounts of tricalcium phosphate with sufficient solubilizing mineral acid to convert the tricalcium phosphate present in said natural rock phosphate to water soluble form, thereby forming an acidic reaction mass in which the phosphate is in a form which is water soluble, then adding to said acidic reaction mass a neutralizing base in sufficient amount to convert all the water soluble phosphate present to a form which is insoluble in water but soluble in ammonium citrate and in sufficient amount to raise the pH of said mass to pH7, and prior to said neutralization adding to said reaction mass a compound of aluminum in an amount sufficient to insure the presence of at least 20 mols of aluminum to each 100 mols of $P_2O_5$ in said mass, said aluminum acting to prevent the reversion of phosphate in said mass to a form which is insoluble in ammonium citrate notwithstanding the complete neutralization of said mass.

7. A process of producing a complex fertilizer which is free from acid and substantially free from tricalcium phosphate and containing nitrogen in nitrate form and nitrogen in ammoniated form and phosphate in a form which is soluble in ammonium citrate which comprises treating a natural rock phosphate containing a substantial amount of tricalcium phosphate with nitric acid in an amount sufficient to convert said tricalcium phosphate to water soluble form and produce an acidic reaction mass, then adding ammonia to said acidic reaction mass in an amount sufficient to neutralize said mass and raise its pH at least to $pH_7$ and prior to said neutralization adding to said mass a compound of aluminum in an amount sufficient to insure the presence of at least 20 mols of Al ions to each 100 mols of $P_2O_5$ present in said mass, said Al ions acting to prevent the reversion of $P_2O_5$ in said reaction mass to a form which is insoluble in ammonium citrate notwithstanding the complete neutralization of said reaction mass.

8. A process of producing a complex fertilizer which is free from acid and substantially free from tricalcium phosphate and containing nitrogen in nitrate form and nitrogen in ammoniated form and in which the phosphate is in a form which is soluble in ammonium citrate which comprises reacting a natural rock phosphate with nitric acid in an amount sufficient to convert the tricalcium phosphate therein contained to water soluble form and thereby producing an acidic reaction mass, then adding ammonia to said acidic reaction mass in an amount sufficient to raise its pH at least to $pH_7$ and thereby completely neutralizing said reaction mass and prior to said neutralization adding to said mass a compound containing Al ions in sufficient amount to insure the presence therein of at least 20 mols of Al to each 100 mols of $P_2O_5$ present in said mass, and adding to said mass a compound containing $SO_4$ ions in an amount equivalent to the added Al ions, said Al ions acting to prevent the reversion of phosphate in said reaction mass to tricalcium form notwithstanding complete neutralization of said mass.

9. A process of producing a complex fertilizer which is free from acid and substantially free from tricalcium phosphate and containing nitrogen in nitrate form and nitrogen in ammoniated form and in which the phosphate is in a form soluble in ammonium citrate which comprises reacting a natural rock phosphate with nitric acid in an amount sufficient to convert the tricalcium phosphate therein contained to water soluble form and thereby producing an acidic reaction mass, adding ammonia to said acidic reaction mass in an amount sufficient to raise its pH at least to $pH_7$ and thereby completely neutralizing said reaction mass and prior to said neutralization adding to said mass a compound containing Al ions in sufficient amount to insure the presence of at least 20 mols of Al to each 100 mols of $P_2O_5$ present in said mass, and adding to said mass sulphate ions in an amount sufficient to convert all calcium nitrate present into calcium sulphate, said Al ions acting to prevent the reversion of phosphate in said reaction mass to tricalcium form notwithstanding complete neutralization of said mass.

10. A process of producing a complex fertilizer which is free from acid and substantially free from tricalcium phosphate and containing nitrogen in nitrate form and nitrogen in ammoniated form and in which the phosphate is in a form soluble in ammonium citrate which comprises reacting a natural rock phosphate with nitric acid in an amount to convert the tricalcium phosphate therein contained to water soluble form and thereby producing an acidic reaction mass, then adding ammonia to said acidic reaction mass in an amount sufficient to raise its pH to above $pH_7$ and thereby completely neutralizing said reaction mass and prior to said neutralization adding to said mass a compound containing Al ions in sufficient amount to insure the presence in said mass of at least 20 mols of Al to each 100 mols of $P_2O_5$ present in said mass and adding to said mass phosphoric acid ions in an amount sufficient to transform any calcium nitrate formed in said mass into calcium phosphate.

11. A process of producing a complex fertilizer which is free from acid and substantially free from tricalcium phosphate and containing nitrogen in nitrate form and nitrogen in ammoniated form and in which the phosphate is in a form which is soluble in ammonium citrate which comprises reacting a natural rock phosphate with nitric acid in an amount sufficient to convert the tricalcium phosphate therein contained to water soluble form and thereby producing an acidic reaction mass, adding ammonia to said acidic reaction mass in an amount sufficient to raise its pH to substantially higher than $pH_7$, adding to said reaction mass a compound containing Al ions in sufficient amount to insure the presence of at least 20 mols of Al to each 100 mols of $P_2O_5$ and adding to said reaction mass after its pH is higher than $pH_7$ sufficient $CO_2$ to convert any calcium nitrate present into calcium carbonate.

References Cited in the file of this patent

UNITED STATES PATENTS

| | | |
|---|---|---|
| 252,029 | Gibbons et al. | Jan. 10, 1882 |
| 1,126,408 | Cowles | Jan. 26, 1915 |
| 1,413,048 | Matheson | Apr. 18, 1922 |
| 1,418,618 | Butt | June 6, 1922 |
| 1,461,077 | Webster | July 10, 1923 |
| 1,788,828 | Goldberg et al. | Jan. 13, 1931 |
| 1,791,103 | Meyers | Feb. 3, 1931 |
| 1,913,791 | Carothers | June 13, 1933 |

FOREIGN PATENTS

| | | |
|---|---|---|
| 1,455 | Great Britain | Apr. 21, 1875 |
| 352,739 | Great Britain | July 16, 1931 |
| 376,934 | Great Britain | July 21, 1932 |

OTHER REFERENCES

Dictionary of Applied Chem., Thorpe, vol. IV, Longmans, Green and Company, 1916, pages 196, 197.